US011550596B2

(12) United States Patent
Offenhartz et al.

(10) Patent No.: US 11,550,596 B2
(45) Date of Patent: *Jan. 10, 2023

(54) DYNAMIC GENERATED WEB UI FOR CONFIGURATION

(71) Applicant: Oracle International Corporation, Redwood Shores, CA (US)

(72) Inventors: John Ken Offenhartz, San Francisco, CA (US); Dana Dawes, Oakland, CA (US)

(73) Assignee: Oracle International Corporation, Redwood Shores (CA)

( * ) Notice: Subject to any disclaimer, the term of this patent is extended or adjusted under 35 U.S.C. 154(b) by 116 days.

This patent is subject to a terminal disclaimer.

(21) Appl. No.: 15/629,291

(22) Filed: Jun. 21, 2017

(65) Prior Publication Data

US 2017/0293496 A1      Oct. 12, 2017

Related U.S. Application Data

(63) Continuation of application No. 11/736,468, filed on Apr. 17, 2007, now Pat. No. 9,753,747.

(51) Int. Cl.
*G06F 9/00* (2006.01)
*G06F 9/445* (2018.01)
(Continued)

(52) U.S. Cl.
CPC ........ *G06F 9/44505* (2013.01); *G06F 3/0482* (2013.01); *G06F 8/38* (2013.01);
(Continued)

(58) Field of Classification Search
CPC ............. H04L 41/0813; H04L 41/0253; H04L 41/0266; H04L 41/082; H04L 41/0856; H04L 41/0879; H04L 63/083; H04L 63/168; H04L 67/36; H04L 67/02; H04L 67/306; G06F 3/0482; G06F 9/44505;
(Continued)

(56) References Cited

U.S. PATENT DOCUMENTS

| | | | | | |
|---|---|---|---|---|---|
| 5,371,797 | A | * | 12/1994 | Bocinsky, Jr. | ....... G06Q 20/305 |
| | | | | | 705/72 |
| 6,788,315 | B1 | * | 9/2004 | Kekic | ..................... H04L 41/22 |
| | | | | | 715/764 |

(Continued)

OTHER PUBLICATIONS

Weiser, Jeri, "HTML Coding: Pull-Down Menus, Scrolling Lists, and Multi-Line Fields", online as early as Nov. 7, 2002, 2 pages.*

(Continued)

*Primary Examiner* — Cesar B Paula
*Assistant Examiner* — David Faber
(74) *Attorney, Agent, or Firm* — Kilpatrick Townsend & Stockton LLP (57) ABSTRACT

A computer-based system comprising a library module associated with an application, the library module using stored configuration data and configuration metadata for the application and a configurator to generate a web user interface using the configuration metadata. The web user interface allowing a user to input configuration information for the application.

18 Claims, 5 Drawing Sheets

Related U.S. Application Data (60) Provisional application No. 60/866,170, filed on Nov. 16, 2006.

(51) Int. Cl.
| | |
|---|---|
| *G06F 3/0482* | (2013.01) |
| *G06F 9/451* | (2018.01) |
| *G06F 16/957* | (2019.01) |
| *G06F 8/38* | (2018.01) |
| *H04L 41/0253* | (2022.01) |
| *H04L 41/0266* | (2022.01) |
| *H04L 41/082* | (2022.01) |
| *H04L 41/0853* | (2022.01) |
| *H04L 41/08* | (2022.01) |
| *H04L 67/75* | (2022.01) |
| *H04L 9/40* | (2022.01) |
| *G06F 16/954* | (2019.01) |
| *H04L 67/02* | (2022.01) |
| *H04L 67/306* | (2022.01) |

(52) U.S. Cl.
CPC .......... *G06F 9/451* (2018.02); *G06F 16/9577* (2019.01); *H04L 41/0253* (2013.01); *H04L 41/0266* (2013.01); *H04L 41/082* (2013.01); *H04L 41/0856* (2013.01); *H04L 41/0879* (2013.01); *H04L 63/083* (2013.01); *H04L 63/168* (2013.01); *H04L 67/75* (2022.05); *G06F 16/954* (2019.01); *H04L 67/02* (2013.01); *H04L 67/306* (2013.01)

(58) Field of Classification Search
CPC ...... G06F 17/30873; G06F 8/38; G06F 9/451; G06F 16/9577; G06F 16/954
See application file for complete search history.

(56) References Cited

U.S. PATENT DOCUMENTS

| | | | | |
|---|---|---|---|---|
| 6,857,013 B2* | 2/2005 | Ramberg | ............ | G06F 11/2294 714/E11.173 |
| 7,158,907 B1* | 1/2007 | Soldo | .................. | G06F 11/3684 712/15 |
| 7,870,614 B1* | 1/2011 | Duhaime | .............. | G06F 21/602 713/192 |
| 2002/0120538 A1* | 8/2002 | Corrie | .................... | G06Q 30/02 705/35 |
| 2002/0138443 A1* | 9/2002 | Schran | ................. | G06Q 20/382 705/64 |
| 2003/0023531 A1* | 1/2003 | Fergusson | .............. | G06Q 10/10 705/36 R |
| 2003/0030664 A1* | 2/2003 | Parry | .................... | G06F 9/4411 715/744 |
| 2003/0069947 A1* | 4/2003 | Lipinski | .................... | H04L 9/40 709/220 |
| 2003/0200340 A1* | 10/2003 | Hutter | .................... | H04L 67/34 709/250 |
| 2004/0006597 A1* | 1/2004 | Hughes | ............... | H04L 61/4555 709/206 |
| 2004/0040012 A1* | 2/2004 | Barsness | ............... | G06F 9/5027 717/145 |
| 2004/0095400 A1* | 5/2004 | Anderson | ........... | G06F 16/9577 707/E17.121 |
| 2004/0148372 A1* | 7/2004 | Campbell | ........... | H04L 41/0253 709/229 |
| 2005/0149535 A1* | 7/2005 | Frey | ..................... | G06F 11/3636 |
| 2005/0268122 A1* | 12/2005 | Young | ..................... | H04L 12/10 713/300 |
| 2006/0004612 A1* | 1/2006 | Chewning | ............... | G06Q 10/10 715/205 |
| 2006/0224711 A1* | 10/2006 | Engel | ..................... | H04L 67/12 709/223 |
| 2006/0248467 A1* | 11/2006 | Elvanoglu | ............. | G06F 9/4493 715/744 |
| 2007/0005342 A1* | 1/2007 | Ortscheid | ................. | G06F 8/33 704/9 |
| 2007/0088556 A1* | 4/2007 | Andrew | ................... | G10L 15/19 704/E15.021 |
| 2007/0130528 A1* | 6/2007 | Johnson | .................. | G06F 9/451 715/761 |
| 2008/0059566 A1* | 3/2008 | Korovkin | ............ | G06F 16/9535 707/E17.109 |
| 2008/0120278 A1* | 5/2008 | Roe | ...................... | G06F 16/9535 |
| 2008/0120557 A1 | 5/2008 | Offenhartz et al. | | |

OTHER PUBLICATIONS

Collins, Greg, "Create a Cascading List from a Hierarchical Data Source", pub. Jul. 6, 2005, 5 pages.*

Armstrong et al, "The J2EE™ 1.4 Tutorial", Dec. 7, 2005, 1542 pages.*

Cisco 1800 Series Software Configuration, Chapter: Configuration: Basic Software Configuration Using the Cisco IOS Command-Line Interface, Copyright © 2004 Cisco Systems, Available online at: http://www.cisco.com/c/en/us/ td/ docs/routers/access/1 800/1 841 / software/configuration/gu ide/sw/beli .pdf, 22pg.

U.S. Appl. No. 11/736,468, Final Office Action dated Feb. 17, 2015, 11 pages.

U.S. Appl. No. 11/736,468, Final Office Action dated Dec. 31, 2015, 15 pages.

U.S. Appl. No. 11/736,468, Final Office Action dated Aug. 25, 2011, 8 pages.

U.S. Appl. No. 11/736,468, Non- Final Office Action dated Oct. 22, 2014, 10 Pages.

U.S. Appl. No. 11/736,468, Non-Final Office Action dated Jan. 14, 2011, 10 pages.

U.S. Appl. No. 11/736,468, Non-Final Office Action dated Jun. 3, 2015, 10 pages.

U.S. Appl. No. 11/736,468, Non-Final Office Action dated Sep. 22, 2016, 22 pages.

U.S. Appl. No. 11/736,468, Notice of Allowance dated May 1, 2017, 38 pages.

Bergman, Introduction to JavaServer Pages, Available online at: https://www6.software .ibm.com/developerworks /educationfjintrojspfj-introjsp-pdf.pdf, Aug. 28, 2001, 57 pg.

Kalbach et al., Web Page Layout: A Comparison Between Left- and Right-justified Site Navigation Menus, Journal of Digital Information, vol. 4 No.1, Available online at: https://journals.tdl.org/jodi/index.php/jodi/article/view/94/93, 2003, 8 pages.

Laurent, Why XML, Available online at: http://www.simonstl.com/articles/whyxml.htm, 1998, 5 pages.

* cited by examiner

DYNAMIC GENERATED WEB UI FOR CONFIGURATION

CROSS-REFERENCE TO RELATED APPLICATIONS

The present application is a continuation of U.S. Non-provisional application Ser. No. 11/736,468, filed Apr. 17, 2007, which claims priority to U.S. Provisional Application No. 60/866,170, filed Nov. 16, 2006, the entire contents of each of which are hereby incorporated by reference in their entireties for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Configuration information is typically used to set up applications. The types of configuration depend on the application. Various configurations can be selectable by users from a user interface for that application configuration. The configuration user interface can include data fields, pull down menus and the like to receive user input.

DETAILED DESCRIPTION

Embodiments of the present invention use metadata to construct a configuration user interface.

Figure 1A:
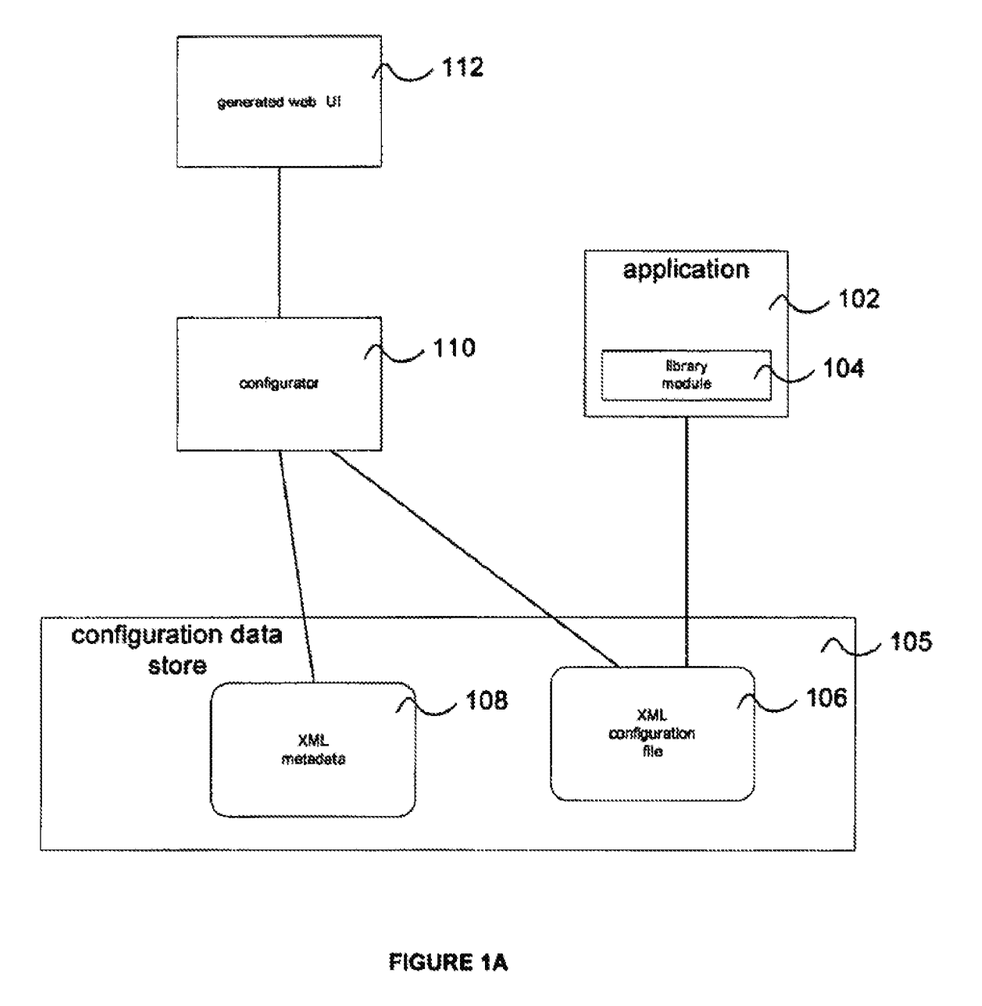
FIGS. 1A and 1B shows a configuration web UI using metadata.

FIG. 1A shows an example of a system of one embodiment. In this case, an application 102 uses a library module 104. The library module 104 can use shared configuration data 106 and configuration metadata 108 for the application 102. The library modules can be used for monitoring and/or logging.

The configuration data 106 can be used to set up and configure applications 102. The configuration data 106 can include data such as database connections, log in configurations, HTTP connections, search configuration, web application start-up and port numbers.

The configuration data 106 and metadata can be stored in data storage 105.

Configuration 10 can be used to produce a web user interface (UT) 112. The web UI can use the metadata 108 to show possible configuration selections to a user.

Figure 1B:
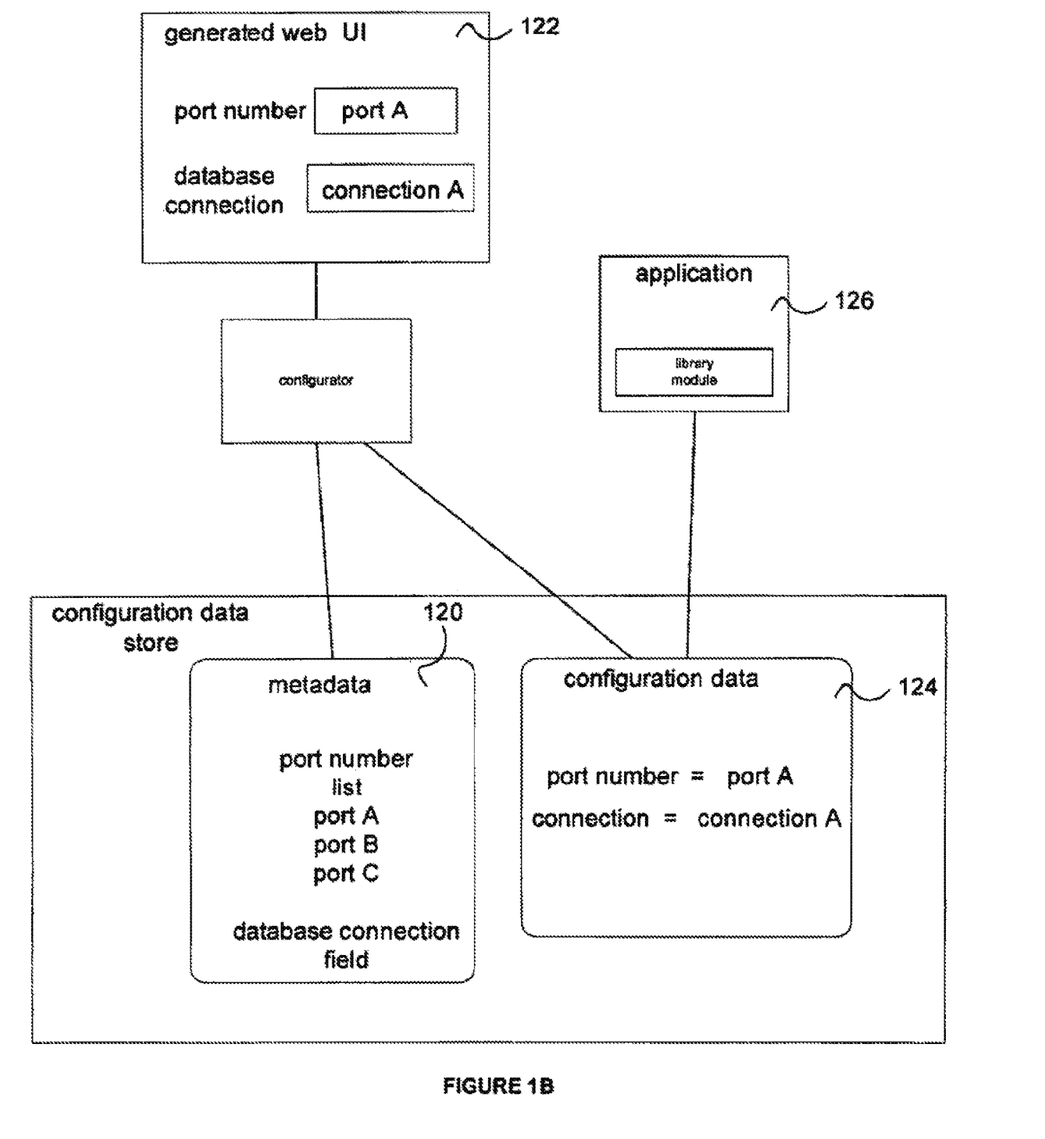

FIG. 1B shows an example where the metadata 120 indicates selectable lists and fields for a constructed web UI 122. The input from web UI 122 can be used to produce configuration data 124 that is used by application 126. In this way, the web UI 122 is easily modifiable for different applications.

A web UI for a new application can easily be created without modifying configuration code just by using different metadata for new application.

The metadata 108 and configuration data 106 can be XML. The metadata can indicate defaults. The system can display choices in a context aware manner based on previous selections. The metadata can also be used to indicate that multiple instance of the application can use the same configuration data.

Figure 2:
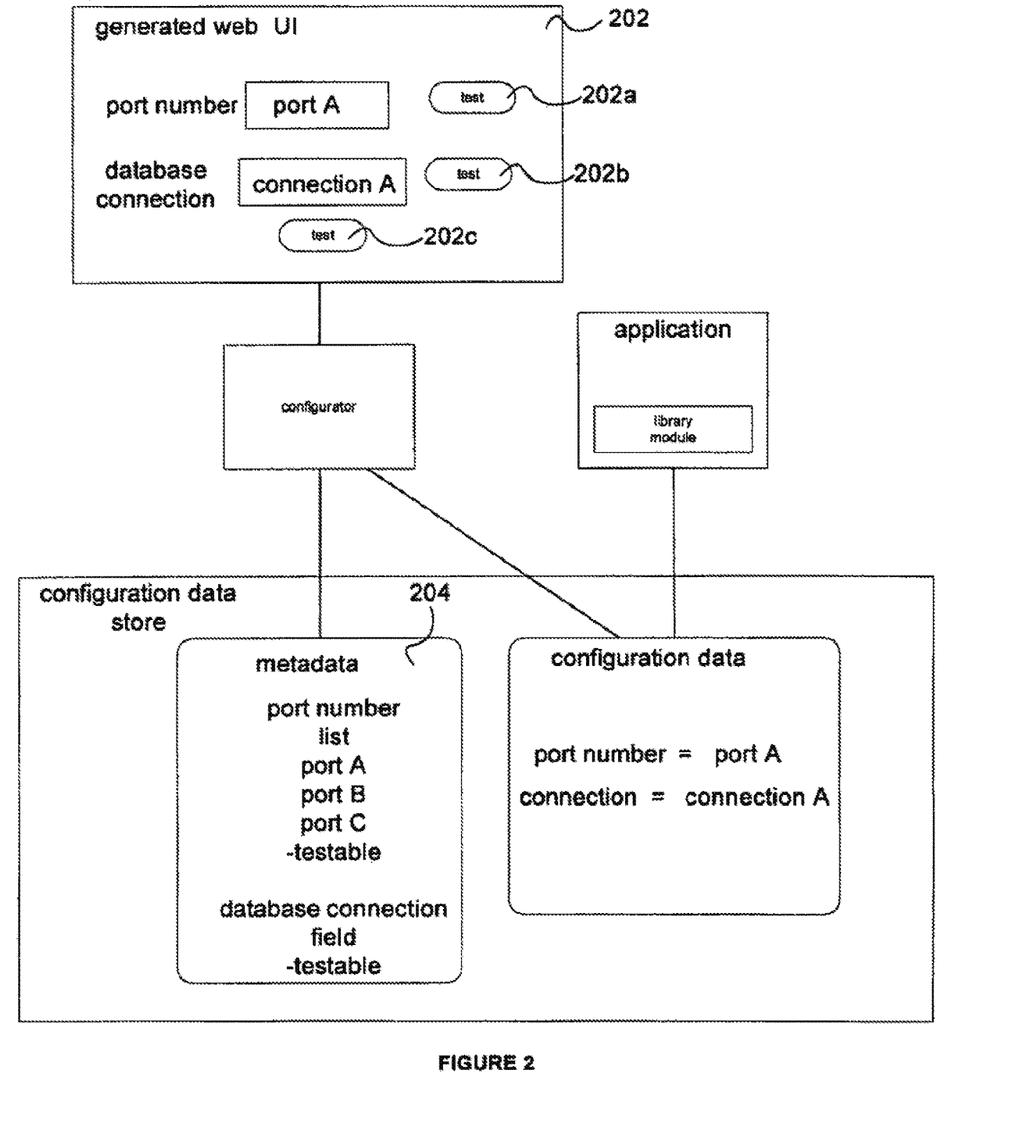
FIG. 2 shows a configuration web UI using metadata that uses a test button.

FIG. 2 shows an example where the web UI 202 includes a test button. The metadata 204 can include an indication of which configurations are testable. The configured web UI 202 can then have test buttons 202a and 202b associated with the indication configuration input and/or a test button associated with the whole configuration page or pages. When the user clicks on the test button, tests of the previously input data can be done. These tests can include pinging input URLs, checking file system and testing database connections or the like. This type of testing can check a configuration without running the application. The configuration can have different types of testing as indicated by the metadata.

In one embodiment, a configuration administrator can be a graphical utility intended to present users with an organized, complete view of the configurable data which drives their various applications. The administrator can be built on top of a configuration component, allowing users to view which applications are using the configuration data store, how those applications should be configured to work properly, what various setting values are and how they control application behavior. Users can be able to configure their application with a utility which is designed to be easy to use and informative.

In one embodiment:
End users can launch the administrator to view and modify the configuration of their installed applications
Installers can launch the administrator to give users a consistent experience of application management
Consultants and support contacts can use the administrator for quickly ascertaining the state of customer configurations with our products
Product teams can publish application metadata along with the release of their products, which is then used to render a comprehensive configuration view.

In one embodiment, the configuration can:
List applications currently using the OpenConfig data store
List the required configuration components needed to fully configure each application
Present the user with context-aware configuration choices, e.g., don't show SQL Server options for an Oracle database connection
Provide validation for use inputs to assure proper configuration values
Provide help, default values, descriptions and other supplemental data for application settings
Low barrier of entry for new application: data-driven, snap-in rendering of Graphical User Interface (GUI) elements The configuration administrator can include functions which make it amendable for use as in installer GUI. The tool can provide users with a view into their distributed configuration environment. Features can provide users with a configuration experience that builds confidence in the software they are using.

The configuration manager can be an extension of a configuration Application Programming Interface (API).

The configuration API allows application to easily load from or write to configuration XML files.

Figure 3:
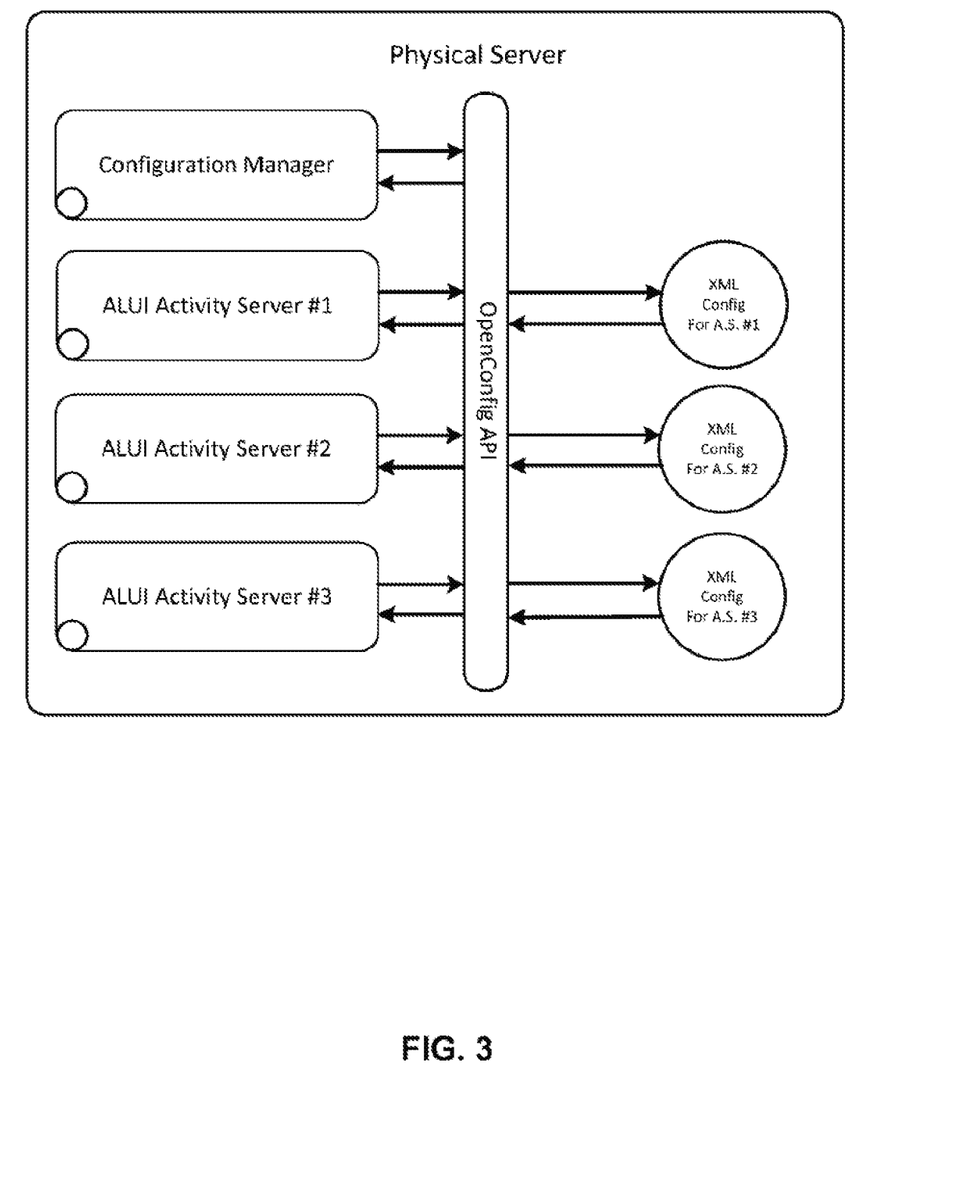
FIG. 3 shows an example of a configuration API.

FIG. 3 shows an example where dots represent an exposed HTTP service or front-end GUI. The configuration manager can connect through the configuration API to read from or write to XML configuration files that are in use by any of the locally installed activity servers using the configuration API.

The configuration manager web UI can act as a front-end to the API, thereby allowing customers to easily and remotely configure their components via a standard web browser. The configuration manager will be read from and written to OpenConfig XML files via the configuration.

The configuration manager can also use a set of metadata for generating a human-friendly UI, including: fields for names and descriptions of various configuration elements, a preferred sort order, resources for on-line help, images, etc.

The configuration manager can be easy for new client applications to adopt the configuration API as their standard configuration tool. This suggests that implementation of this utility should rely on resources which are easily published by application groups during development.

The configuration manager can provide a complete, context-neutral, lightweight tool for the configuration administration of software products.

The configuration manager can be assessable over the web via a standard web browser. This can allows application administrators to easily reconfigure components from their desktop without initiating any additional terminal or console sessions on remote machines. Since configuration could be accessed remotely; it is not a problem if the server on which the software is being installed does not have a web browser installed.

Figure 4:
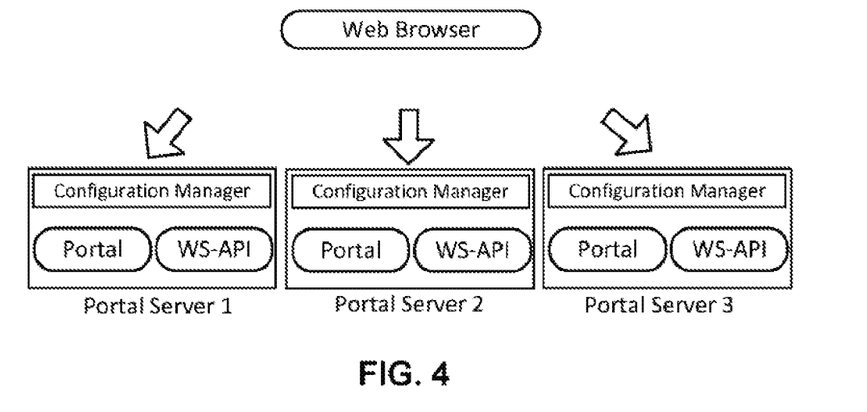
FIG. 4 shows an example of a web browser configuration.

FIG. 4 shows an administrator started from a single web browser which is able to reconfigure each of the 3 front-end Portal and servers inside of their deployment quickly, easily, and remotely.

Since the configuration manager can be remotely accessible via any standard web browser, and the settings that can be changed may affect the application behavior and/or expose data base passwords, the system can ensure that only authorized users can access the configuration screens, and that the communication link between the client browser and server is secured.

The first level of security protection over the configuration manager can be password authentication. The password can be specified at the time the configuration manager is installed.

To protect the transfer of passwords between the client browser and the configuration manager, the application server that hosts the configuration manager can be protected by SSL encryption. Self signed certificates can be used.

The configuration manager can handle configuration data encryption by calling into the configuration API. The manager need not maintain a key store. The encryption can involve hard-coding keys into the source code.

The manager can use mask characters for displaying GUI widgets with control encrypted values.

A remotely accessible browser-based configuration manager can use basic intrusion detection system. Multiple failed login attempts can generate an error email to a pre-specified administrator email address.

The logon screen for the configuration manager can include the hostname of the machine that is running the configuration management service, as well as a username, password and logon button.

Errors during logon can be ambiguous if they relate to an incorrect username or password. In one embodiment, when an incorrect username, incorrect password, or incorrect combination thereof has been entered, the error message that appears on the screen need only indicate that a logon failure occurred and that the user should check their username and/or password.

By keeping the error messages consistent and vague, it can be more difficult for a remote user to brute force the username and password pair.

There need not be an option to "save" the password, and the session can be closed as soon as the browser window has been closed, or more than 30 minutes has passed without activity from the client browser The first screen after a successful login can be a welcome screen, which can indicate the following information.

Server Name

Server IP Address

Server Detected Operating System

Configuration Manager Version

A persistent configuration navigation can also be shown.

Any newly installed components that require the first time configuration wizard to run can be called-out in the Welcome screen of the Configuration Manager.

A persistent, dynamic navigation can be visible on every page of the configuration manager UI. This navigation can be dynamic in that it can display all of the available, configurable services and components on the machine.

Applications configuration can be listed. This listing can have human-friendly labels for each application and is presented in a natural, canonical way.

The navigation can display a high-level view of every application installed on the machine, and access to each individual settings page.

Each application node in the manager can expand to list the components which can be configured for the application. Components can be aggregates of related settings. The manager can give warnings to the user if a component's configuration data is missing or deficient.

For each component, the administrator can get a listing of setting group/settings. What settings are available for configuration can be specified.

Settings can be represented by standard GUI widgets (e.g. textboxes, select controls, etc.). For example Portal can have sub-pages of Database settings, Imageserver URL and so on.

The configuration manager can provide a "Summary" page that describes all of the application settings for all of the applications using OpenConfig that have been installed on the local machine.

For each application grouping within the configuration manager UI, there can be a indicator as to which settings are required by the application in order to start properly. This can be particularly important when an application is being configured for the first time. The user can be indicated to exactly which settings must be set, and which ones can be skipped or left undefined.

Each group of application settings can have an optionally available, first time configuration wizard. This wizard can also be able to be optionally triggered at a future time, in case the user wishes to re-visit the configuration wizard.

For components that have not yet been configured, the configuration wizard can be required to run for the first time. This can ensure that all settings are reviewed and sent properly. Input validation can be done to ensure strings are strings, integers and integers, etc.

Certain required fields, such as database ports and user names can be prevented from remaining blank. An error can appear when a required field is blank.

Input can be validated after "Save" button has been pressed. Any error messages can appear using the error state behavior.

Any error when validating input, saving to file or other general error information can be displayed at the top of the particular page where the error occurred.

The error message can be displayed in such a way that it is clearly visible. Any form fields that contain incorrectly specified information, such as invalid settings for ports, can be identified by some kind of visual marker.

Password fields in the configuration manager UI can be unreadable, and protected via the HTML "password" form input type to prevent passwords from being displayed in the UI.

Upon reloading password fields in the configuration manager, the password itself need not be re-loaded. These web fields can be pre-populated with some king of blank data representing the password, but should not contain the actual password itself.

Any settings that require a restart to the application can trigger a clearly visible indication in the UI, so that an administrator will immediately know whether a restart to the application or service is required.

These notifications can be visible in an error state/error notification area.

The UI for the configuration manager can prevent users from losing settings. Whenever a change is made that is not saved, and the user tries to switch to another setting screen, some warning can be displayed to the user to prevent the possible loss of that setting. Additionally, there can be a way to cancel undesired changes.

These buttons can be located on every settings page, and it can be required to press the "Save" or "Cancel" button before being able to successfully navigate away from the page if some changes have been made.

The "Save" and "Cancel" button can always be located on the same location of the page, and can be in a location that ensures the user will notice all of the available configuration options before pressing the "Save" or Cancel" button.

Each component, as listed by the parent application, can have the capacity to provide on-line help if the application publisher has supplied any. This help is not required to be localized. This help can be application agnostic, since it is possible to share components between applications. This last consideration can be up to the component publisher's discretion.

Each setting, listed by the parent component, can have the capacity to provide on-line help if the application publisher has supplied any. This help is not required to be localized.

The configuration manager can leverage an embedded application server, and can run in its own instance to prevent dependencies that may fail and render the configuration manager unusable.

To help secure the configuration manager, the HTTPS port used need not be the usual standard port of 8080, 7001, 443 or 80. Using a non-standard HTTPS port will help prevent a few problem scenarios, such as:

Network auto-detection tools—some network auto detection tools may accidentally discover the configuration manager HTTPS port.

Automated crawlers/web mirroring tools—some network crawlers may discover or try to crawl the contents of the configuration manager login page.

Port conflicts with other applications/servers—the configuration manager service should not bind to a port that may already be in use by another service on the machine.

In one embodiment, the configuration manager need only be required to create or reset configurations on the local machine. It need not be required for the proper boot-up of other services on the machine. This way, a security conscious administrator could disable the service after configuring the ALUI components.

Since the configuration manager tool is used for configuring the application components, the configuration manager can support all of the same browsers that the application supports.

A feature has been discussed for the configuration manager is one where a component, having been configured, can be tested for operational success. For example, an OpenDB component could attempt to login, given the credentials specified in its settings, and perform some kind of trivial database action. This feature need not test the component settings as part of the application which uses them; it can be tested with additional and stand-alone test code which is deployed with the configuration manager.

The metadata specification can allow contributors to designate a component as testable and provide a token which can be used to locate the test to run.

Application test functions can test an application's complete configuration profile-such as by initiating some kind of diagnostic warm-up sequence.

Client application functions can support the engineering groups who are publishing either novel products or new versions of existing software. The unifying principle for these features can be to reduce the amount of work needed to use the configuration manager as their configuration solution.

Client applications can be able to display their configuration objects in the manager by simply specifying a data set describing their requirements. They need not have to write JAVA classes or incorporate into a larger, heavier framework. This data can be part of the publication process and can be distributed with the application resources.

Applications can be able to specify the context they use to run. This can be built into the configuration API for the sake of flexibility. The specification can live in the application's published metadata.

Each application, through its list of required Context, can have the ability to specify the components which are required to run. The specification lives in the application's published metadata.

An application can define a custom component to aggregate a group of settings which are related to each other. At this point, the client application can publish a template of its own so that the manager can display it properly and provide validation, etc.

Client applications can be called upon to specify metadata for their configuration profile. One aspect of this is the inclusion of validation rules to apply to values which the user inputs.

Any GUI can provide a consistent user experience; hence configuration elements should be displayed in a consistent, predictable way from use to use.

Application publishers can be able to specify, in their metadata, human-friendly labels for all their configuration elements.

It can be desirable to show or hide some setting groups based on values which have been entered. Such context aware display rules can be incorporated into the metadata for the application's configuration profile.

Similar to other sections, the client application can provide as part of its metadata, help resources which can be a available to the user while using the manager.

Client applications can publish default values for their settings in their application's metadata. In one embodiment, the default values can be applied/available only if the configuration manager is used to edit the settings.

This feature can intend for populating an initially empty configuration. There are other ways to do this, e.g., scriptable installs/upgrades, a separate merge utility with supplemental mapping data, etc. While running, applications need not access the metadata store for default values, since there can be already provision in the OpenConfig API for specifying them.

The manager can be based on OpenConfig and the Open-Kernel framework. It can be client of these components and can standardize on a specific release of them.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A method, comprising:

retrieving, by a configuration application on a computer system from a centralized configuration data store, configuration metadata and first configuration data, the configuration metadata comprising:
  a first configuration element of a first user application on the computer system,
  a second configuration element of a second user application on the computer system,
  a diagnostic warm-up sequence for a third user application comprising test functions that test a complete configuration profile for the third user application, and
  the first configuration data comprising a first data value for the first configuration element;

generating, using the configuration application, a graphical user interface, the graphical user interface comprising:
  a first data entry field pre-populated with the first data value retrieved from the centralized configuration data store, and
  a second data entry field associated with the second configuration element;

storing, by the configuration application in the centralized configuration data store, a second configuration data comprising a second data value for the second configuration element, wherein:
  the second data value is received via the second data entry field of the graphical user interface,
  the first configuration data is used by the first user application during execution for configuration of the first user application, and
  the second configuration data is used by the second user application during execution for configuration of the second user application;

executing, by the computer system, a first time configuration wizard to receive and store third configuration data in the centralized configuration data store, wherein:
  the first time configuration wizard provides an interface for entry of one or more data values for one or more configuration elements of the third user application, the first time configuration wizard requires entry of a third data value associated with a third configuration element of the third user application to store within the third configuration data, the third configuration element is a string value and is a setting required by the third user application to execute properly, and the third configuration data is used by the third user application during execution for configuration of the third user application;

receiving, by the configuration application from the first time configuration wizard, the third data value;

validating that the third data value is a string; and executing, by the computer system, each user application by retrieving the associated configuration data from the centralized configuration data store and using the associated configuration data to configure the user application for execution.

2. The method of claim 1, wherein the configuration metadata indicates that the first configuration element is testable and includes a token used to locate at least one test.

3. The method of claim 2, further comprising:

receiving, by the computer system, an indication of a user selection of a test button associated with the first configuration element via the graphical user interface; and performing, by the computer system in response to receiving the indication of the user selection of the test button, the at least one test of the first data value, wherein the at least one test includes pinging an input URL, checking a file system, testing a database connection, or a combination thereof, the at least one test further implemented as standalone code that does not perform the at least one test as part of the first user application.

4. The method of claim 1, wherein the configuration metadata includes a name and a description of the second configuration element, resources for on-line help, and a list of selectable values for the first configuration element comprising the first data value.

5. The method of claim 4, wherein the configuration metadata further includes a fourth configuration element of the first user application, options for the first configuration element depending on selection of a fourth data value for the fourth configuration element, and wherein the first data entry field for the first configuration element is a dropdown box populated with the list of selectable values filtered to be context aware based on the selection of the fourth data value.

6. The method of claim 1, wherein the graphical user interface is accessed through a web browser, and wherein generating the graphical user interface comprises:

receiving a username and a password;

authenticating a user associated with the username and the password using secure socket layer encryption; and displaying a generic error if the authenticating fails.

7. The method of claim 1, further comprising:

retrieving, by the configuration application from the centralized configuration data store, a fourth configuration data, the fourth configuration data having a fourth data value for a fourth configuration element, wherein the fourth data value is encrypted in the centralized configuration data store; and regenerating, using the configuration application, the graphical user interface to display (1) the first configuration element associated with the first data value, (2) the second configuration element associated with the second data value, (3) the third configuration element associated with the third data value, and (4) the fourth configuration element associated with the fourth data value, wherein the fourth data value is displayed using at least one mask character based on the fourth data value being encrypted.

8. The method of claim 1, wherein the second configuration element is a port number and the second data value is the port number used when the second user application is executed.

9. The method of claim 1, wherein a new application can inherit configuration data from a configured application.

10. A system, comprising:

a processor; and a memory having stored thereon instructions that, when executed by the processor, cause the processor to:

execute a configuration application, the configuration application configured to:

retrieve configuration metadata and first configuration data from a centralized configuration data store, the configuration metadata comprising:

a first configuration element of a first user application on the system, a second configuration element of a second user application on the system, a diagnostic warm-up sequence for a third user application comprising test functions that test a complete configuration profile for the third user application, and the first configuration data comprising a first data value for the first configuration element, generate a graphical user interface comprising:

a first data entry field pre-populated with the first data value and a second data entry field associated with the second configuration element, and store a second configuration data comprising a second data value for the second configuration element, wherein:

the second data value is received via the second data entry field of the graphical user interface, the first configuration data is used by the first user application during execution for configuration of the first user application, and the second configuration data is used by the second user application during execution for configuration of the second user application;

execute a first time configuration wizard to receive and store third configuration data in the centralized configuration data store, wherein:

the first time configuration wizard provides an interface for entry of one or more data values for one or more configuration elements of the third user application, the first time configuration wizard requires entry of a third data value associated with a third configuration element of the third user application to store within the third configuration data, the third configuration element is a string value and is a setting required by the third user application to execute properly, and the third configuration data is used by the third user application during execution for configuration of the third user application;

receive, by the configuration application from the first time configuration wizard, the third data value;

validate that the third data value is a string; and execute each user application by retrieving the associated configuration data from the centralized configuration data store and using the associated configuration data to configure the user application for execution.

11. The system of claim 10, wherein the configuration metadata indicates that the first configuration element is testable and includes a token used to locate at least one test.

12. The system of claim 11, wherein the memory has stored thereon further instructions that, when executed by the processor, cause the processor to:

receive an indication of a user selection of a test button associated with the first configuration element via the graphical user interface; and perform, in response to receiving the indication of the user selection of the test button, the at least one test of the first data value, wherein the at least one test includes pinging an input URL, checking a file system, testing a database connection, or a combination thereof, the at least one test further implemented as standalone code that does not perform the at least one test as part of the first user application.

13. The system of claim 10, wherein the configuration metadata includes a name and a description of the second configuration element, resources for on-line help, and a list of selectable values for the first configuration element comprising the first data value.

14. The system, of claim 13, wherein the configuration metadata further includes a fourth configuration element of the first user application, options for the first configuration element depending on selection of a fourth data value for the fourth configuration element, and wherein the first data entry field for the first configuration element is a dropdown box populated with the list of selectable values filtered to be context aware based on the selection of the fourth data value.

15. The system of claim 10, wherein the graphical user interface is accessed through a web browser, and wherein generating the graphical user interface comprises:

receiving a username and a password;

authenticating a user associated with the username and the password using secure socket layer encryption; and displaying a generic error if the authenticating fails.

16. The system of claim 10, the configuration application is further configured to:

retrieve, from the centralized configuration data store, a fourth configuration data, the fourth configuration data having a fourth data value for a fourth configuration element, wherein the fourth data value is encrypted in the centralized configuration data store; and regenerate the graphical user interface to display (1) the first configuration element associated with the first data value, (2) the second configuration element associated with the second data value, (3) the third configuration element associated with the third data value, and (4) the fourth configuration element associated with the fourth data value, wherein the fourth data value is displayed using at least one mask character based on the fourth data value being encrypted.

17. The system of claim 10, wherein the second configuration element is a port number and the second data value is the port number used when the second user application is executed.

18. The system of claim 10, wherein a new application can inherit configuration data from a configured application.

* * * * *